United States Patent
Ueoka et al.

(10) Patent No.: US 12,534,775 B2
(45) Date of Patent: Jan. 27, 2026

(54) METHOD OF COOLING CONTROL FOR STEEL PLATE, COOLING CONTROL DEVICE, AND METHOD OF MANUFACTURING STEEL PLATE

(71) Applicant: JFE STEEL CORPORATION, Tokyo (JP)

(72) Inventors: Satoshi Ueoka, Tokyo (JP); Takahiro Hirano, Tokyo (JP); Ori Kumano, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 793 days.

(21) Appl. No.: 17/429,413

(22) PCT Filed: Dec. 2, 2019

(86) PCT No.: PCT/JP2019/047030
§ 371 (c)(1),
(2) Date: Aug. 9, 2021

(87) PCT Pub. No.: WO2020/162004
PCT Pub. Date: Aug. 13, 2020

(65) Prior Publication Data
US 2022/0127694 A1    Apr. 28, 2022

(30) Foreign Application Priority Data
Feb. 7, 2019    (JP) .................................. 2019-020771

(51) Int. Cl.
*C21D 11/00*    (2006.01)
*C21D 1/18*    (2006.01)
(Continued)

(52) U.S. Cl.
CPC .............. *C21D 11/005* (2013.01); *C21D 1/18* (2013.01); *C21D 1/62* (2013.01); *C21D 6/002* (2013.01);
(Continued)

(58) Field of Classification Search
None
See application file for complete search history.

(56) References Cited

U.S. PATENT DOCUMENTS 4,785,646 A    11/1988    Uekaji et al.
9,186,710 B2    11/2015    Akashi et al.
(Continued)

FOREIGN PATENT DOCUMENTS

CN    101406902 A    4/2009
CN    101489696 A    7/2009
(Continued)

OTHER PUBLICATIONS

Machine translation of JP2004154817A. (Year: 2004).*
(Continued)

*Primary Examiner* — Xiaowei Su
(74) *Attorney, Agent, or Firm* — Oliff PLC

(57) ABSTRACT

A method of cooling control for a steel plate, a cooling control device, and a method of manufacturing a steel plate, which adjust an upper/lower water ratio and prevent C-warping during cooling. The method of cooling control includes: determining an upper/lower water ratio of a steel plate being cooled wherein at least one of a C-warping amount and a curvature is within a target permissible range, based on a past operating condition, a past upper/lower water ratio when cooling under the past operating condition has been implemented, and at least one of a past C-warping amount and a past curvature measured by a shape measuring meter at an outgoing side of a cooling zone when the cooling (Continued)

under the past operating condition is implemented; and adjusting an amount of cooling water to be blown onto the steel plate to reach the upper/lower water ratio.

6 Claims, 6 Drawing Sheets

(51) Int. Cl.
*C21D 1/62* (2006.01)
*C21D 6/00* (2006.01)
*C21D 9/46* (2006.01)
*C22C 38/02* (2006.01)
*C22C 38/04* (2006.01)
*C22C 38/18* (2006.01)

(52) U.S. Cl.
CPC .............. *C21D 6/005* (2013.01); *C21D 6/008* (2013.01); *C21D 9/46* (2013.01); *C22C 38/02* (2013.01); *C22C 38/04* (2013.01); *C22C 38/18* (2013.01)

(56) References Cited

U.S. PATENT DOCUMENTS

| | | |
|---|---|---|
| 9,364,879 B2 | 6/2016 | Shimoi et al. |
| 9,566,625 B2 | 2/2017 | Akashi et al. |
| 2010/0219566 A1 | 9/2010 | Shimoi et al. |
| 2014/0053886 A1 | 2/2014 | Akashi et al. |
| 2014/0060139 A1 | 3/2014 | Akashi et al. |
| 2022/0127694 A1 | 4/2022 | Ueoka et al. |

FOREIGN PATENT DOCUMENTS

| | | | |
|---|---|---|---|
| CN | 103987470 A | | 8/2014 |
| CN | 104117541 A | | 10/2014 |
| JP | 862-112732 A | | 5/1987 |
| JP | S62-158825 A | | 7/1987 |
| JP | H02-179819 A | | 7/1990 |
| JP | H02-179829 A | | 7/1990 |
| JP | H06-89411 B2 | | 11/1994 |
| JP | H10-5868 A | | 1/1998 |
| JP | 2004154817 A | * | 6/2004 |
| JP | 2009-191286 A | | 8/2009 |
| JP | 2015-199112 A | | 11/2015 |
| JP | 2016-16416 A | | 2/2016 |
| JP | 2016-47538 A | | 4/2016 |
| JP | 2016-209897 A | | 12/2016 |
| WO | 2020/162004 A1 | | 8/2020 |

OTHER PUBLICATIONS

Machine translation of JP2015-199112. (Year: 2015).*
Mar. 13, 2024 Office Action issued in European Patent Application No. 19914449.4.
Jan. 19, 2021 Office Action issued in Japanese Patent Application No. 2020-505924.
Apr. 13, 2021 Office Action issued in Japanese Patent Application No. 2020-505924.
Feb. 8, 2021 Office Action issued in Taiwanese Patent Application No. 108145649.
Jan. 7, 2020 Search Report issued in International Patent Application No. PCT/JP2019/047030.
Aug. 10, 2021 International Preliminary Report on Patentability issued in International Patent Application No. PCT/JP2019/047030.
Oct. 26, 2022 Office Action Issued in Chinese Patent Application No. 201980091365.0.
Feb. 3, 2022 Extended European Search Report issued in Patent Application No. 19914449.4.
Wikipedia, "Sagita (geometry)" <https://en.wikipedia.org/w/index.php?title=Sagitta_(geometry)&oldid=837866287> pp. 1-2 (Jul. 16, 2024).
Alberny, "Hot rolling of flat products on train belt—Part 1," Engineering Techniques, M7940, vol. 2, pp. 2-16 (Mar. 10, 2007) (with partial translation).
Aug. 2, 2024 Letter from the Opponent submitted in European Patent Application No. 19914449.4.

* cited by examiner

METHOD OF COOLING CONTROL FOR STEEL PLATE, COOLING CONTROL DEVICE, AND METHOD OF MANUFACTURING STEEL PLATE

TECHNICAL FIELD

The present invention relates to a method of cooling control for a steel plate, a cooling control device, and a method of manufacturing a steel plate.

BACKGROUND ART

When manufacturing a steel plate, it is necessary to ensure mechanical properties required for a steel plate, especially, strength and toughness. This is achieved by performing work operations of performing accelerated cooling on a high-temperature steel plate after hot rolling without change on the same line, or of once air-cooling a high-temperature steel plate after hot rolling up to room temperature, reheating it offline, and cooling it after that. In these cooling methods, to ensure material properties required for the steel plate, it is necessary to increase a cooling rate. Moreover, it is important that cooling is uniformly performed over the entire of a plate surface to ensure material uniformity and suppress the occurrence of distortion during cooling. In particular, when cooling distortion occurs, it is necessary to ensure the flatness of a steel plate after cooling by using a straightener such as a roller straightener and a press, and thus this is a major obstacle to shortening a delivery deadline because additional processes are needed.

As to the shape of a steel plate after water cooling, a shape defect called C-warping in which the height of both ends in the width direction and the height of the center in the width direction of the steel plate are different occurs in many cases. This C-warping is generally said to be caused by a temperature deviation between the upper surface and the lower surface of the steel plate during cooling. Meanwhile, this C-warping is prevented by adjusting a water amount ratio of a cooling water amount from the upper side to a cooling water amount from the lower side with respect to the steel plate.

For example, PTL 1 to PTL 4 are known as conventional technologies of adjusting an upper/lower water ratio.

A flatness shape defect prevention cooling method for a hot rolled steel plate disclosed in PTL 1 is a method of supplying cooling water to a hot rolled steel plate from nozzles placed above and below to cool the steel plate while transferring the steel plate in the longitudinal direction of the steel plate. Then, for each of a plurality of cooling zones of which each corresponds to a length unit by which cooling water upper/lower water injection amounts are controllable in the longitudinal direction of a cooling device, the upper and lower temperature difference is detected in units of length of the steel plate at the incoming side of the corresponding cooling zone. Then, an upper/lower water injection amount ratio with respect to the unit length of the steel plate in the corresponding cooling zone is corrected and controlled based on the detected upper and lower temperature difference.

Moreover, a method of cooling control for a steel plate disclosed in PTL 2 includes a step of determining an upper/lower water ratio of a cooling device at which a flatness pass rate of a steel plate to be cooled becomes not less than a predetermined value, from past manufacturing results. Then, the method includes a step of predicting a temperature distribution after cooling in the width direction of the steel plate from the determined upper/lower water ratio and other manufacturing conditions. Moreover, the method of cooling control includes a step of determining a flow rate distribution of cooling water in the width direction of the steel plate by which the predicted temperature distribution width after cooling is not more than a certain value. Then, the method includes a step of controlling to change a water amount of cooling water to be supplied to the cooling device during cooling of the steel plate to reach the determined upper/lower water ratio and the determined flow rate distribution of cooling water.

Moreover, a thick plate manufacturing method disclosed in PTL 3 is a method of performing slow cooling on a hot rolled steel plate in a cooling bed after performing accelerated cooling, to control a steel plate shape after the accelerated cooling to a predetermined steel plate shape by controlling a cooling condition of the accelerated cooling. For each product type, a correlation between a steel plate shape at an incoming side and a steel plate shape at an outgoing side of the cooling bed is previously obtained. Then, the method is to, based on the previously obtained correlation, estimate a steel plate shape at the incoming side of the cooling bed such that a steel plate shape at the outgoing side of the cooling bed has a permissible steel plate shape as a product and adjust a condition for accelerated cooling to has the estimated steel plate shape.

A shape control method for a control cooling steel plate disclosed in PTL 4 is to arrange, on a thick plate production line, a hot straightener having a roll bending function downstream of a rolling machine and arrange accelerated cooling equipment downstream of it. Then, the method is to arrange a steel plate front and back temperature measurement thermometer inside an accelerated cooling device and arrange a steel plate surface temperature distribution meter, a steel plate surface thermometer, and a steel plate shape meter just after the accelerated cooling device. From steel plate shape information and temperature information obtained from these, the method is to estimate a steel plate shape when being cooled to room temperature after accelerated cooling. Moreover, an upper/lower water ratio during accelerated cooling and an amount of roll bending of a hot straightener with respect to the next material are automatically calculated from absolute amounts of shape and temperature in a short time. Then, the method is to automatically correct for the next coolant and ensure a final shape of a series of accelerated cooling steel plates manufactured in continuous operations.

CITATION LIST

Patent Literatures

PTL 1: JPH 6-89411 B
PTL 2: JP 2016-209897 A
PTL 3: JP 2009-191286 A
PTL 4: JPH 10-5868 A

SUMMARY OF INVENTION

Technical Problem

However, the flatness shape defect prevention cooling method for a hot rolled steel plate disclosed in PTL 1, the method of cooling control for a steel plate disclosed in PTL 2, the thick plate manufacturing method disclosed in PTL 3, and the shape control method for a control cooling steel plate disclosed in PTL 4 have the following problems.

In other words, in the case of the flatness shape defect prevention cooling method for the hot rolled steel plate disclosed in PTL 1, because an upper and lower temperature difference of the steel plate is detected at the incoming side of each cooling zone, it is necessary to measure a lower-surface temperature just after cooling the steel plate. The temperature of the lower surface of the steel plate is difficult to be stably measured by a generally used radiation thermometer over a long period due to scale falling off from the steel plate, cooling water, or steam, or the like. Moreover, when cooling the steel plate up to room temperature like a heat treatment, the upper and lower temperatures of the steel plate are originally equalized and thus the measurement itself becomes meaningless.

In the case of the method of cooling control for the steel plate disclosed in PTL 2, an upper/lower water ratio of the cooling device at which a flatness pass rate of the steel plate to be cooled becomes not less than the predetermined value is determined from past manufacturing results. For this reason, the effects can be expected theoretically. However, because the ratio is determined with the flatness pass rate, it is necessary to record information of the same conditions about 100 to 500 pieces, and thus the number of records will be very large. Moreover, when a change occurs due to machine deterioration over time or the like, it is difficult to follow it.

In the case of the thick plate manufacturing method disclosed in PTL 3, a correlation between a steel plate shape at the incoming side and a steel plate shape at the outgoing side of the cooling bed is previously obtained for each product type. A steel plate shape at the incoming side of the cooling bed such that the steel plate shape at the outgoing side of the cooling bed has a permissible steel plate shape as a product is estimated based on the previously obtained correlation. Then, the condition for accelerated cooling is adjusted to have the estimated steel plate shape, but it does not describe what kind of cooling condition should actually be used.

In the case of the shape control method for the control cooling steel plate disclosed in PTL 4, an upper/lower water ratio correction amount $\Delta Wuh$ with respect to the next steel in the control cooling device when it is determined that a cooling stop temperature is not less than a boundary temperature and a steel plate shape has distortion is calculated by the following Equation (1). Moreover, an upper/lower water ratio correction amount $\Delta Wus$ with respect to the next steel in the control cooling device when it is determined that the cooling stop temperature is less than the boundary temperature and the steel plate shape has distortion or warping is calculated by the following Equation (2).

$$\Delta Wuh = (M, t, Tt, \Delta T_{ou}) \quad (1)$$

$$\Delta Wus = (M, t, Tt, Hhs) \quad (2)$$

Herein, M is a lower water density of the control cooling device, t is a thickness of the steel plate, Tt is a cooling stop temperature, $\Delta T_{ou}$ is a front and back temperature difference of the steel plate, and Hhs is a distortion amount or a warping amount.

As described above, because the upper/lower water ratio correction amount $\Delta Wuh$ is calculated by a function of M, t, Tt, and $\Delta T_{ou}$, and $\Delta Wus$ is calculated by a function of M, t, Tt, and Hhs, a correction amount of the upper/lower water ratio with respect to the next steel cannot be accurately calculated when these functions are not right.

As described above, in the case of PTL 1 to PTL 4, the upper/lower water ratio may not be accurately adjusted during cooling of the steel plate, and thus the C-warping of the steel plate may not be suitably prevented.

The present invention was made to solve the conventional problems. An object of the present invention is to provide a method of cooling control for a steel plate, a cooling control device, and a method of manufacturing a steel plate, which make it possible to accurately adjust an upper/lower water ratio and prevent C-warping of the steel plate during cooling of the steel plate.

Solution to Problem

To solve the above problems, according to one aspect of the present invention, a method of performing cooling control for a steel plate while making the steel plate pass through a cooling zone in a conveyance direction, includes: determining an upper/lower water ratio with respect to a steel plate to be cooled in such a manner that at least one of a C-warping amount and a curvature of the steel plate to be cooled is within a target permissible range, based on a past operating condition of a steel plate, a past upper/lower water ratio with respect to the steel plate when cooling under the past operating condition of the steel plate has been implemented, and at least one of a past C-warping amount and a past curvature of the steel plate measured by a shape measuring meter arranged at an outgoing side of the cooling zone when the cooling under the past operating condition of the steel plate has been implemented; and adjusting an amount of cooling water to be blown onto the steel plate to reach the upper/lower water ratio determined in the determining the upper/lower water ratio.

Moreover, according to another aspect of the invention, a cooling control device for a steel plate performing cooling control while making the steel plate pass through a cooling zone in a conveyance direction, includes: an upper/lower water ratio determination unit configured to determine an upper/lower water ratio with respect to a steel plate to be cooled in such a manner that at least one of a C-warping amount and a curvature of the steel plate to be cooled is within a target permissible range, based on a past operating condition of a steel plate, a past upper/lower water ratio with respect to the steel plate when cooling under the past operating condition of the steel plate has been implemented, and at least one of a past C-warping amount and a past curvature of the steel plate measured by a shape measuring meter arranged at an outgoing side of the cooling zone when the cooling under the past operating condition of the steel plate has been implemented; and a cooling water amount adjustment unit configured to adjust an amount of cooling water to be blown onto the steel plate to reach the upper/lower water ratio determined by the upper/lower water ratio determination unit.

Furthermore, a method of manufacturing a steel plate according to still another aspect of the invention is to use the method of cooling control for the steel plate described above.

Advantageous Effects of Invention

According to the method of cooling control for a steel plate, the cooling control device, and the method of manufacturing a steel plate of the present invention, an upper/lower water ratio can be accurately adjusted and C-warping of the steel plate can be suitably prevented, during cooling of the steel plate.

DESCRIPTION OF EMBODIMENTS

An embodiment of the present invention will now be described with reference to the drawings. An embodiment to be described below exemplifies a device and a method for embodying the technical idea of the present invention, and the technical idea of the present invention does not specify the material, shape, structure, arrangement, etc. of components in the following embodiment.

Moreover, the drawings are schematic. For that reason, it should be noted that a relationship, a ratio, etc. between the thickness and the plane dimension are different from the actual ones, and a relationship and a ratio between dimensions in different drawings may have different parts.

Figure 1:
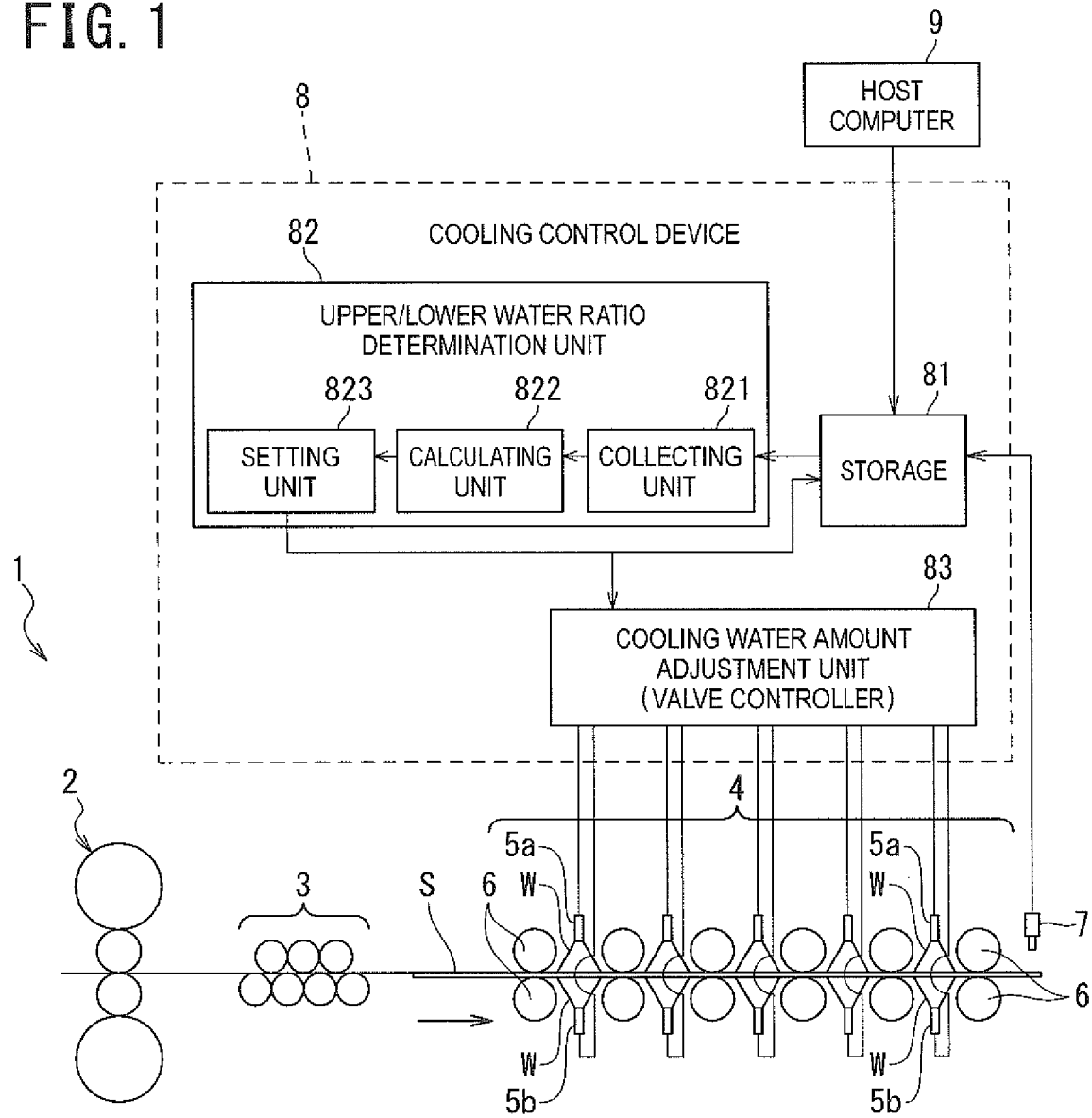
FIG. 1 is a schematic configuration view illustrating steel plate production equipment to which a method of cooling control for a steel plate according to an embodiment of the present invention is applied.

FIG. 1 illustrates a schematic configuration of steel plate production equipment 1 to which a method of cooling control for a steel plate according to an embodiment of the present invention is applied. The steel plate production equipment 1 includes a rolling machine 2 configured to perform hot rolling on a steel plate S, a leveler 3 configured to straighten the steel plate S rolled by the rolling machine 2, and a cooling zone 4 configured to cool the straightened steel plate S while making the plate pass through the zone in its conveyance direction (arrow direction illustrated in FIG. 1). The steel plate production equipment 1 further includes a shape measuring meter 7 installed at an outgoing side of the cooling zone 4 in the conveyance direction and a cooling control device 8 configured to control cooling of the steel plate S by the cooling zone 4. Herein, the steel plate S to be cooled is a steel plate of which the plate thickness is 4.5 mm or more and the plate width is 1,800 mm or more.

Herein, in the cooling zone 4, a plurality (five pairs in the present embodiment) of pairs of upper-side cooling nozzle 5a and lower-side cooling nozzle 5b paired up and down with respect to a conveyance line are arranged side by side at a predetermined pitch along the conveyance direction of the steel plate S. Cooling water W is blown toward the steel plate S from each of the cooling nozzles 5a and 5b. Moreover, a plurality of drainer rolls 6 are installed at incoming sides of the cooling nozzles 5a and 5b located at the most incoming side in the conveyance direction, between the cooling nozzles 5a and 5a and between the cooling nozzles 5b and 5b adjacent to each other in the conveyance direction, and at outgoing sides of the cooling nozzles 5a and 5b located at the most outgoing side in the conveyance direction.

Moreover, the shape measuring meter 7 measures a C-warping amount and a curvature of the steel plate S cooled in the cooling zone 4.

Figure 5:
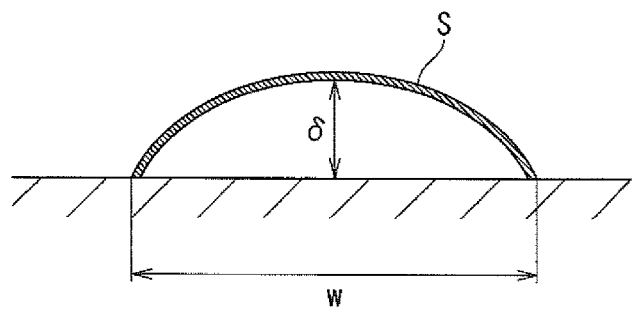
FIG. 5 is a view explaining the C-warping of the steel plate when viewed from a conveyance direction.
Figure 6:
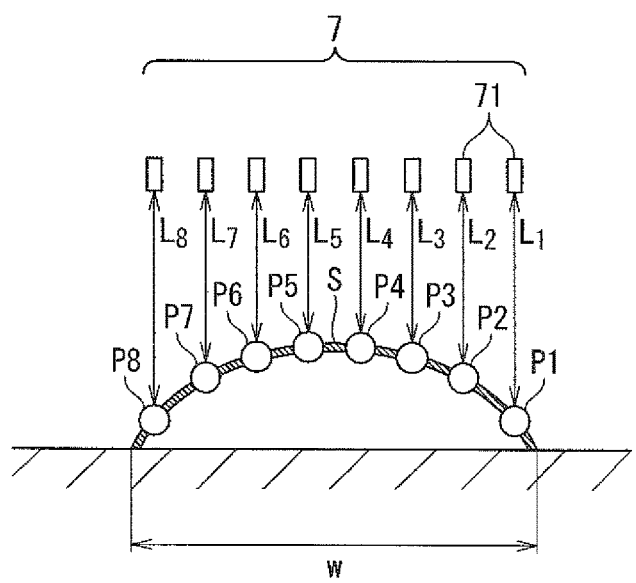
FIG. 6 is a view explaining a measurement principle by a shape measuring meter.

Herein, the C-warping of the steel plate S and the measurement principle of the shape measuring meter 7 will be described with reference to FIGS. 4 to 6.

Figure 4:
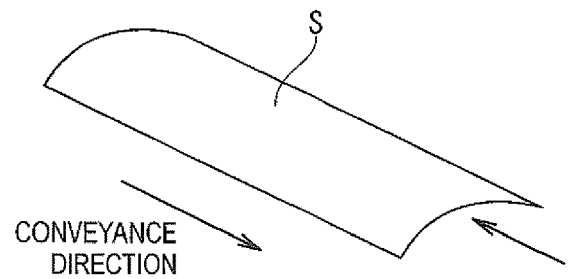
FIG. 4 is a perspective view explaining C-warping of the steel plate.

As illustrated in FIG. 4, the C-warping means a shape defect in which the steel plate S is deformed in an arc shape along its width direction and the heights of both ends in the width direction and the center in the width direction are different. As illustrated in FIG. 5, this C-warping is defined by the maximum height δ (hereinafter, called C-warping amount δ) near the center of the plate width with respect to a plate width w of the steel plate S.

The C-warping is caused due to a temperature deviation between the upper and lower surfaces of the steel plate S. For example, when a cooling capacity of the upper surface is larger than a cooling capacity of the lower surface of the steel plate S, the temperature of the upper surface having a high cooling capacity becomes lower than the temperature of the lower surface. As a result, because an amount of shrinkage of the upper surface of the steel plate S becomes larger than that of the lower surface, the steel plate S has a concave shape during water cooling. On the other hand, because a tensile strain is applied to the upper surface having a large amount of shrinkage and a compressive strain is applied to the lower surface from a balance of stress, the direction of C-warping is reversed and the steel plate S changes to a convex shape when the temperature of the upper surface of the steel plate S reheats after cooling. When the same water amount is blown onto the upper surface and the lower surface of the steel plate S to cool the plate, the cooling capacity of the upper surface is generally higher than that of the lower surface. This is because the cooling water blown onto the upper surface of the steel plate S stays on the plate and the stagnant cooling water further cools the upper surface of the steel plate S. Therefore, to ensure the balance of cooling, the water amount of the lower surface is generally increased more than that of the upper surface of the steel plate S.

Therefore, to generally prevent the C-warping of the steel plate S, it is preferable to measure the upper surface temperature and the lower surface temperature of the steel plate S at the end of cooling and to adjust an amount of cooling water based on the result in such a manner that the upper surface temperature and the lower surface temperature of the steel plate S are identical to each other.

However, as described above, the generated water vapor is difficult to be discharged on the lower surface of the steel plate S, and thus the temperature cannot be stably measured by a radiation thermometer. Moreover, a process of cooling the steel plate S up to room temperature is performed in many cases, and even if the temperature is measured after cooling in this case, a temperature difference between the upper surface and the lower surface of the steel plate S is already extinct, and thus the measurement itself becomes meaningless.

Therefore, in the present embodiment, without measuring the upper surface temperature and the lower surface temperature of the steel plate S, the shape of the steel plate S immediately after being cooled in the cooling zone, that is, the C-warping amount $\delta$ and a curvature k to be described below are measured by the shape measuring meter 7. Then, an upper/lower water ratio is determined by the cooling control device 8 by using the measurement result, and a cooling balance between the upper surface and the lower surface of the steel plate S is adjusted.

As the shape measuring meter 7, various distance meters are available on the market with the development of measuring equipment in recent years. Any distance meter may be selected, but a plurality of laser rangers of which each can measure one point on the steel plate S can be employed, for example. When the shape measuring meter 7 is configured of the plurality of laser rangers, the shape measuring meter 7 is configured of eight laser rangers 71 in FIG. 6. The eight laser rangers 71 are installed along the width direction of the steel plate S at a predetermined pitch. The laser rangers 71 respectively measure distances (distance L1 to distance L8 in FIG. 6) up to points (point P1 to point P8 in FIG. 6) on the steel plate S. Then, the C-warping amount $\delta$ (see FIG. 5) is estimated by approximating the measurement result with an arc approximation or a quadratic curve by the least squares method etc. Moreover, the distribution of the C-warping amounts $\delta$ in the longitudinal direction of the steel plate S can be estimated by performing distance measurement while passing the steel plate S directly under the plurality of laser rangers 71. In addition, measurement may be simultaneously performed in the width direction and the longitudinal direction of the steel plate S by utilizing an industrial 3D scanner etc. as the shape measuring meter 7.

Because the steel plate S is deformed in an arc shape when the plate is C-warped, the C-warping amount $\delta$ tends to increase more as the plate width of the steel plate S is wider. Therefore, in the present embodiment, the C-warping amount $\delta$ of the steel plate S is estimated by the shape measuring meter 7, and further the C-warping amount $\delta$ is converted into the curvature k by the following Equation (3). As described above, the influence of the plate width w of the steel plate S can be removed by converting the C-warping amount $\delta$ into the curvature k of the steel plate S. Equation (3) approximates a relationship between the C-warping amount $\delta$ and the curvature k.

$$k=2\times\delta/((w/2)^2+\delta^2) \quad (3)$$

Figure 7:
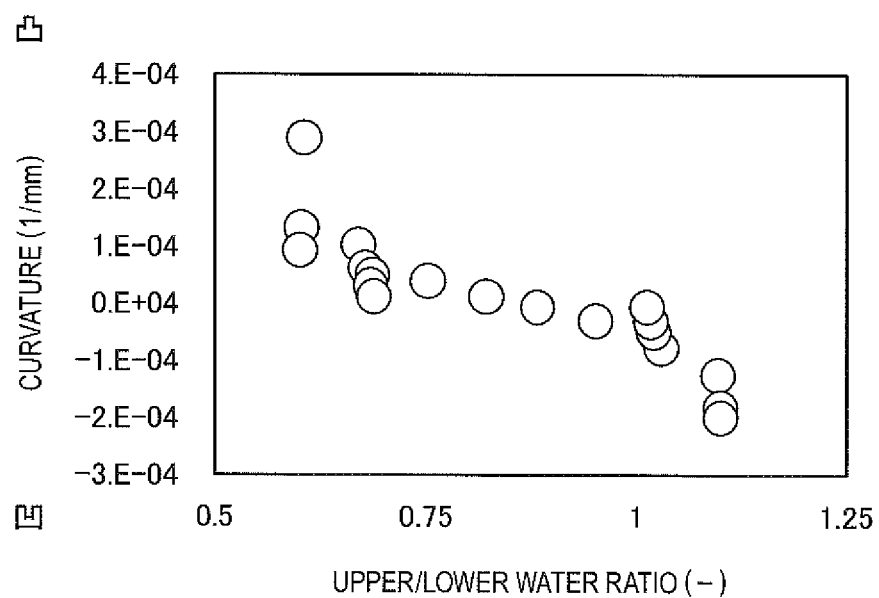
FIG. 7 is a graph illustrating a relationship between an upper/lower water ratio and a curvature when a water density of an upper surface of the steel plate is changed, under a condition that a steel plate having a plate thickness of 15 mm and a plate width of 2000 to 3000 mm is set to have a water cooling time of 0.65 sec and a water density of a lower surface of the steel plate of 3000 L/min·m², as an example.

As an example, FIG. 7 illustrates a relationship between the upper/lower water ratio and the curvature k when a water density of the upper surface of the steel plate is changed, under a condition that a steel plate having a plate thickness of 15 mm and a plate width of 2000 to 3000 mm has a water cooling time of 0.65 sec and a water density of the lower surface of the steel plate of 3000 L/min·m². The relationship between the upper/lower water ratio with respect to the steel plate S and the curvature k of the steel plate S has a first-order correlation as illustrated in FIG. 7, and in this example, it turns out that the curvature k is substantially zero when the upper/lower water ratio is approximately 0.85.

Next, the cooling control device 8 controls cooling of the steel plate S in the cooling zone 4, and specifically, determines an upper/lower water ratio with respect to the steel plate S by using the above C-warping amount $\delta$ and curvature k measured by the shape measuring meter 7 and controls cooling of the steel plate S.

Herein, as illustrated in FIG. 1, the cooling control device 8 includes a storage 81, an upper/lower water ratio determination unit 82, and a cooling water amount adjustment unit (valve controller) 83. The cooling control device 8 is a computer system that has arithmetic processing functions for realizing functions of the storage 81, the upper/lower water ratio determination unit 82, and the cooling water amount adjustment unit 83 by executing a program on computer software. The computer system includes ROM, RAM, CPU, and the like, and realizes the above functions on software by executing various dedicated programs previously stored in the ROM or the like.

The storage 81 stores therein data such as past operating conditions (e.g., composition, plate thickness, plate width, cooling start temperature, and cooling end temperature of the past the steel plate S) of the steel plate S and a past upper/lower water ratio when cooling under the past operating conditions has been implemented. Herein, the data of the past upper/lower water ratio with respect to the steel plate S is data obtained by adding an upper/lower water ratio that is set in Step S14 and stored in the storage 81 in Step S15 to be described below.

Moreover, the storage 81 is connected to the shape measuring meter 7, and stores therein data such as the past C-warping amount $\delta$ and the past curvature k when cooling under the past operating conditions of the steel plate S has been implemented.

Furthermore, the storage 81 is connected to a host computer 9. Operating conditions (e.g., composition, plate thickness, plate width, cooling start temperature, and cooling end temperature of the steel plate S to be cooled) of the steel plate S to be cooled next are input into the storage 81 from the host computer 9, and are stored in the storage.

The upper/lower water ratio determination unit 82 is connected to the storage 81. Based on the past operating conditions, the past upper/lower water ratio, and the past C-warping amount $\delta$ and the past curvature k of the steel plate S stored in the storage 81, the upper/lower water ratio determination unit 82 determines an upper/lower water ratio in such a manner that the curvature k of the steel plate S to be cooled is within a target permissible range.

Specifically, the upper/lower water ratio determination unit 82 includes a collecting unit 821, a calculating unit 822, and a setting unit 823.

The collecting unit 821 acquires the operating conditions of the steel plate S to be cooled input into the storage 81. Moreover, the collecting unit 821 collects, from the storage 81, the past operating conditions similar to the operating conditions of the steel plate S to be cooled, the past upper/lower water ratio, and the past C-warping amount $\delta$ and the past curvature k of the steel plate S. Herein, determination of whether or not the past operating conditions of the steel plate S are similar to the operating conditions of the steel plate S to be cooled next may be performed based on a distance between vectors of information indicating the operating conditions. Moreover, the number of collected data of the past upper/lower water ratio, the past C-warping amount δ, and the past curvature k with respect to the steel plate S is preferable to be at least three, or is sufficient to be about 20, because the upper/lower water ratio and the curvature k etc. have a first-order correlation.

Moreover, the calculating unit 822 calculates a relationship between the past upper/lower water ratio with respect to the steel plate S and the past curvature k of the steel plate S measured by the shape measuring meter 7 arranged at the outgoing side of the cooling zone 4, which are collected by the collecting unit 821.

Figure 8:
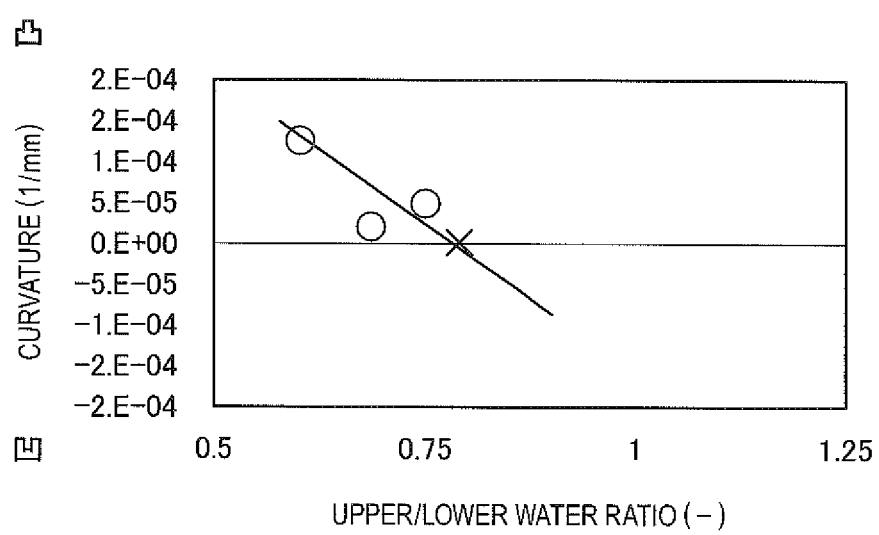
FIG. 8 is a graph illustrating an example of linear approximation with the latest three data in a graph illustrating a relationship between a past upper/lower water ratio with respect to the steel plate and a past curvature of the steel plate measured by the shape measuring meter arranged at an outgoing side of the cooling zone.

Specifically, the calculating unit 822 creates a graph as illustrated in FIG. 8, which indicates the relationship between the past upper/lower water ratio with respect to the steel plate S and the past curvature k of the steel plate S that are collected by the collecting unit 821.

In FIG. 8, the collected data of the past upper/lower water ratio with respect to the steel plate S and the past curvature k of the steel plate S are the most recently operated three data.

Furthermore, from the relationship between the past upper/lower water ratio of the steel plate S and the past curvature k of the steel plate calculated by the calculating unit 822, the setting unit 823 sets an upper/lower water ratio in such a manner that the curvature k of the steel plate to be cooled is within the target permissible range.

In the example illustrated in FIG. 8, the setting unit 823 makes a linear approximation of the most recently operated three data (O plotting in FIG. 8) to set an upper/lower water ratio (X plotting in FIG. 8) at which the curvature k of the steel plate S to be cooled next is estimated to be zero.

In addition, the curvature k of the steel plate S to be cooled may not be necessarily zero, and the curvature k may be within the target permissible range (±3 mm in terms of the C-warping amount δ).

Moreover, it is preferable that the actual indicated value of the upper/lower water ratio with respect to the steel plate S to be cooled is set so as not to increase an operation amount from the upper/lower water ratio with respect to the previously cooled steel plate S. For this reason, the actual indicated value of the upper/lower water ratio with respect to the steel plate S to be cooled is obtained by adding a value obtained by multiplying a gain G by an operation amount from the upper/lower water ratio with respect to the previously cooled steel plate S to the previous upper/lower water ratio, as indicated by the following Equation (4). Herein, the appropriate value of the gain G is about 0.2 to 0.5.

Indicated value of upper/lower water ratio=(Predicted curvature zero water amount ratio−Upper/lower water ratio of previous steel plate)× G+Upper/lower water ratio of previous steel plate  (4)

Because the appropriate upper/lower water ratio is changed due to the change in cooling water temperature, air temperature, machine precision, etc. in many cases, adjustment corresponding to a change in air temperature, machine precision, etc. can be performed by sequentially modifying the upper/lower water ratio based on the above most recently operated information.

Next, the cooling water amount adjustment unit (valve controller) 83 adjusts an amount of cooling water to be blown onto the steel plate S to reach the upper/lower water ratio determined by the upper/lower water ratio determination unit 82. In this case, the cooling water amount adjustment unit may fix the amount of cooling water with respect to the lower surface of the steel plate S and change only the amount of cooling water with respect to the upper surface of the steel plate S, or may adjust an upper/lower water ratio in such a manner that a total amount of cooling water in the cooling zone 4 becomes constant.

The control of the cooling stop temperature of the steel plate S is implemented by using another software. For example, target operating conditions (e.g., composition, plate thickness, plate width, cooling start temperature, and cooling stop temperature of the steel plate S) are set, and then an upper/lower water ratio with respect to the steel plate S is set as in the present embodiment. Then, a total amount of the amounts of cooling water with respect to the upper and lower surfaces of the steel plate S and a plate passing speed of the steel plate S are set in such a manner that a cooling stop temperature becomes a target cooling stop temperature through the computation of a heat transfer model etc. Then, the cooling water amount adjustment unit (valve controller) 83 may adjust the number of the cooling nozzles 5a and 5b to blow cooling water to reach the set upper/lower water ratio and the set total amount of the amounts of cooling water.

Figure 2:
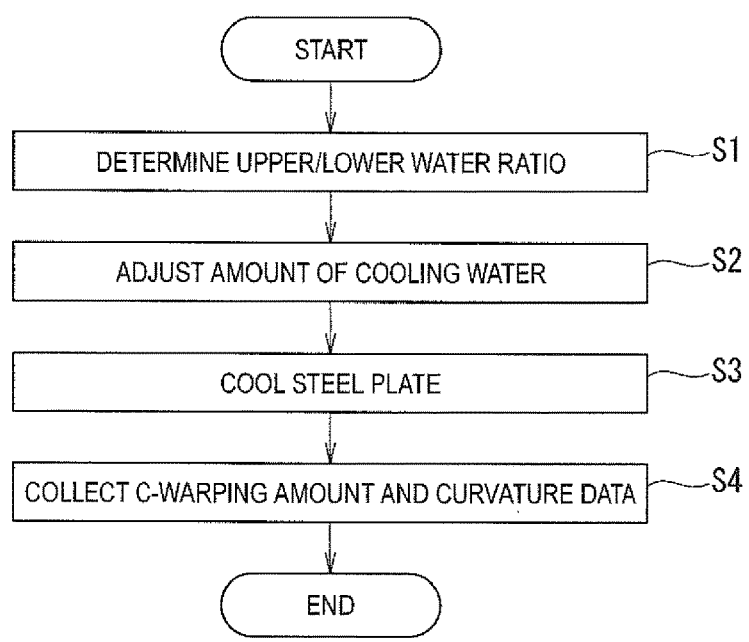
FIG. 2 is a flowchart explaining a flow of processing executed by a cooling control device.

Next, a method of cooling control for a steel plate according to the present invention will be described with reference to a flowchart explaining a flow of processing executed by the cooling control device illustrated in FIG. 2.

First, in Step S1, based on the past operating conditions, the past upper/lower water ratio, the past C-warping amount δ, and the past curvature k of the steel plate S, the upper/lower water ratio determination unit 82 determines an upper/lower water ratio in such a manner that the curvature k of a steel plate to be cooled is within a target permissible range (upper/lower water ratio determination step).

Figure 3:
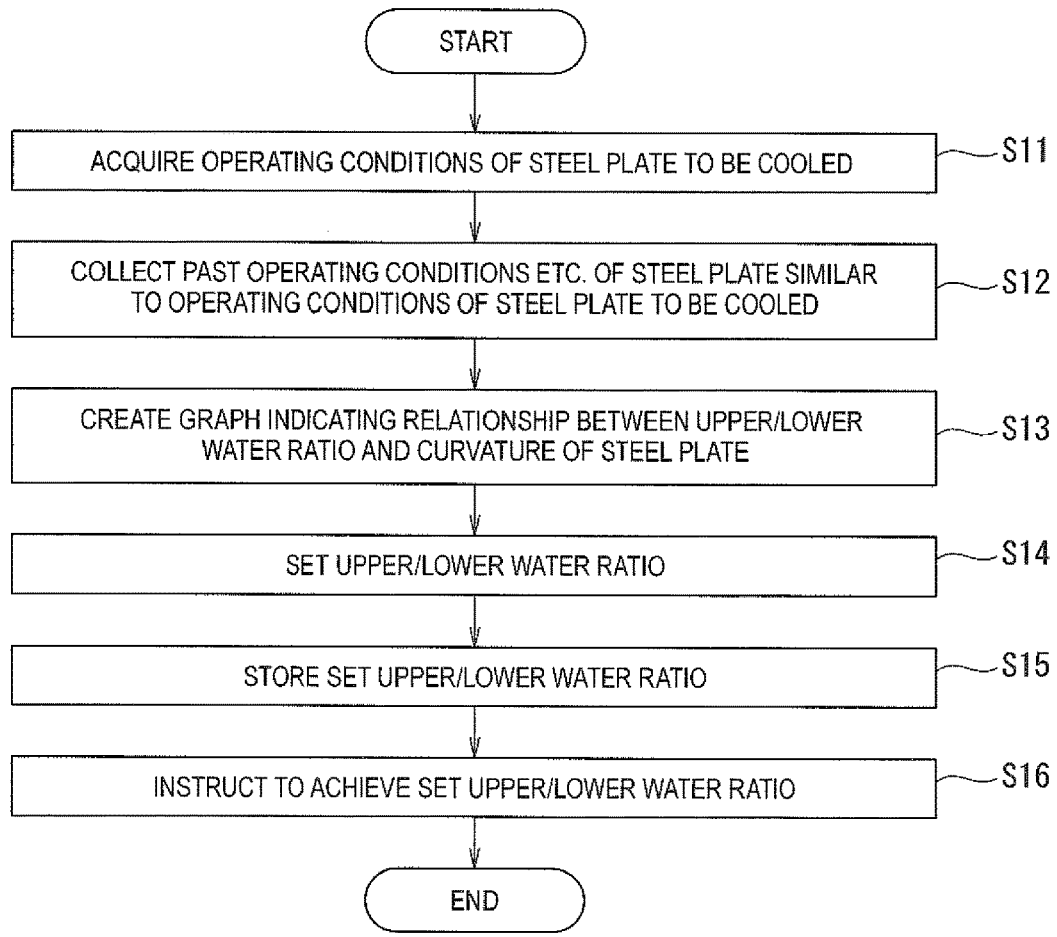
FIG. 3 is a flowchart illustrating the details of the flow of processing in Step S1 (upper/lower water ratio determination step) illustrated in FIG. 2.

The details of the flow of processing in Step S1 are illustrated in FIG. 3. First, in Step S11, the collecting unit 821 acquires, from the storage 81, operating conditions (e.g., steel composition, plate thickness, plate width, cooling start temperature, and cooling end temperature) of the steel plate S to be cooled, which are input into the storage 81 from the host computer 9.

Next, in Step S12, the collecting unit 821 collects, from the storage 81, past operating conditions similar to production specifications of the steel plate S to be cooled, the past upper/lower water ratio, the past C-warping amount δ, and the past curvature k of the steel plate S (collection step).

Next, in Step S13, the calculating unit 822 calculates a relationship between the past upper/lower water ratio and the past curvature k with respect to the steel plate S collected by the collecting unit 821 (calculation step). Specifically, the calculating unit 822 creates a graph as illustrated in FIG. 8, which indicates the relationship between the past upper/lower water ratio and the past curvature k with respect to the steel plate S collected by the collecting unit 821.

Next, in Step S14, from the relationship between the past upper/lower water ratio and the past curvature k of the steel plate S calculated by the calculating unit 822, the setting unit 823 sets an upper/lower water ratio in such a manner that the curvature k of the steel plate to be cooled is within the target permissible range (setting step).

After that, in Step S15, the setting unit 823 transmits to the storage 81 data of the upper/lower water ratio with respect to the steel plate S to be cooled, which is set in Step 14, and the storage 81 stores therein the data of the upper/lower water ratio.

Then, in Step S16, the setting unit 823 instructs the cooling water amount adjustment unit (valve controller) 83 to achieve the upper/lower water ratio with respect to the steel plate S to be cooled, which is set in Step 14.

If the upper/lower water ratio determination step by Step S1 is terminated, the process proceeds to Step S2. In Step S2, the cooling water amount adjustment unit (the valve controller) 83 adjusts an amount of cooling water to be blown onto the steel plate S to reach the upper/lower water ratio determined by the upper/lower water ratio determination unit (cooling water amount adjustment step).

The cooling water amount adjustment unit (valve controller) 83 sets the number of the cooling nozzles 5a and 5b to blow cooling water to reach the upper/lower water ratio set in the upper/lower water ratio determination step and the total amount of amounts of cooling water set by the other software.

Next, the process proceeds to Step S3. In Step S3, the cooling water is blown onto the steel plate S from the set cooling nozzles 5a and 5b to implement cooling of the steel plate S in the cooling zone 4.

Then, the process proceeds to Step S4. In Step S4, the shape measuring meter 7 arranged at the outgoing side of the cooling zone 4 measures the C-warping amount δ and the curvature k of the cooled steel plate S, and the storage 81 of the cooling control device 8 collects the measured C-warping amount δ and curvature k of the steel plate S.

As a result, the cooling control of the steel plate S is terminated.

As described above, according to the method of cooling control for the steel plate S and the cooling control device 8 of the present embodiment, based on the past operating conditions, the past upper/lower water ratio, the past C-warping amount δ, and the past curvature k of the steel plate S, the upper/lower water ratio is determined in such a manner that the curvature k of the steel plate to be cooled is within the target permissible range (Step S1: the upper/lower water ratio determination step, the upper/lower water ratio determination unit 82). Then, the amount of cooling water to be blown onto the steel plate S is adjusted to reach the determined upper/lower water ratio (Step S2: the cooling water amount adjustment step, the cooling water amount adjustment unit 83).

As a result, it is possible to accurately adjust the upper/lower water ratio and suitably prevent the C-warping of the steel plate S during cooling of the steel plate S.

As described above, the embodiment of the present invention has been described, but the present invention is not limited to this embodiment, and various changes and improvements can be applied to the present invention.

For example, the collecting unit 821 collects from the storage 81 the past C-warping amount δ and the past curvature k when the cooling under the past operating conditions of the steel plate S has been implemented, but may collect at least one of the past C-warping amount δ and the past curvature k.

Moreover, the calculating unit 822 calculates the relationship between the collected past upper/lower water ratio and past curvature k with respect to the steel plate S, but may calculate a relationship between the past upper/lower water ratio and at least one of the past C-warping amount δ and the past curvature k.

Furthermore, from the calculated relationship between the past upper/lower water ratio and at least one of the past C-warping amount δ and the past curvature k of the steel plate S, the setting unit 823 may set the upper/lower water ratio in such a manner that at least one of the C-warping amount δ and the curvature k of the steel plate to be cooled is within the target permissible range.

Moreover, the method of cooling control according to the present invention is applied to the steel plate production equipment 1 illustrated in FIG. 1, but may be applied to the steel plate production equipment 1 from which the leveler 3 is removed.

Figure 9:
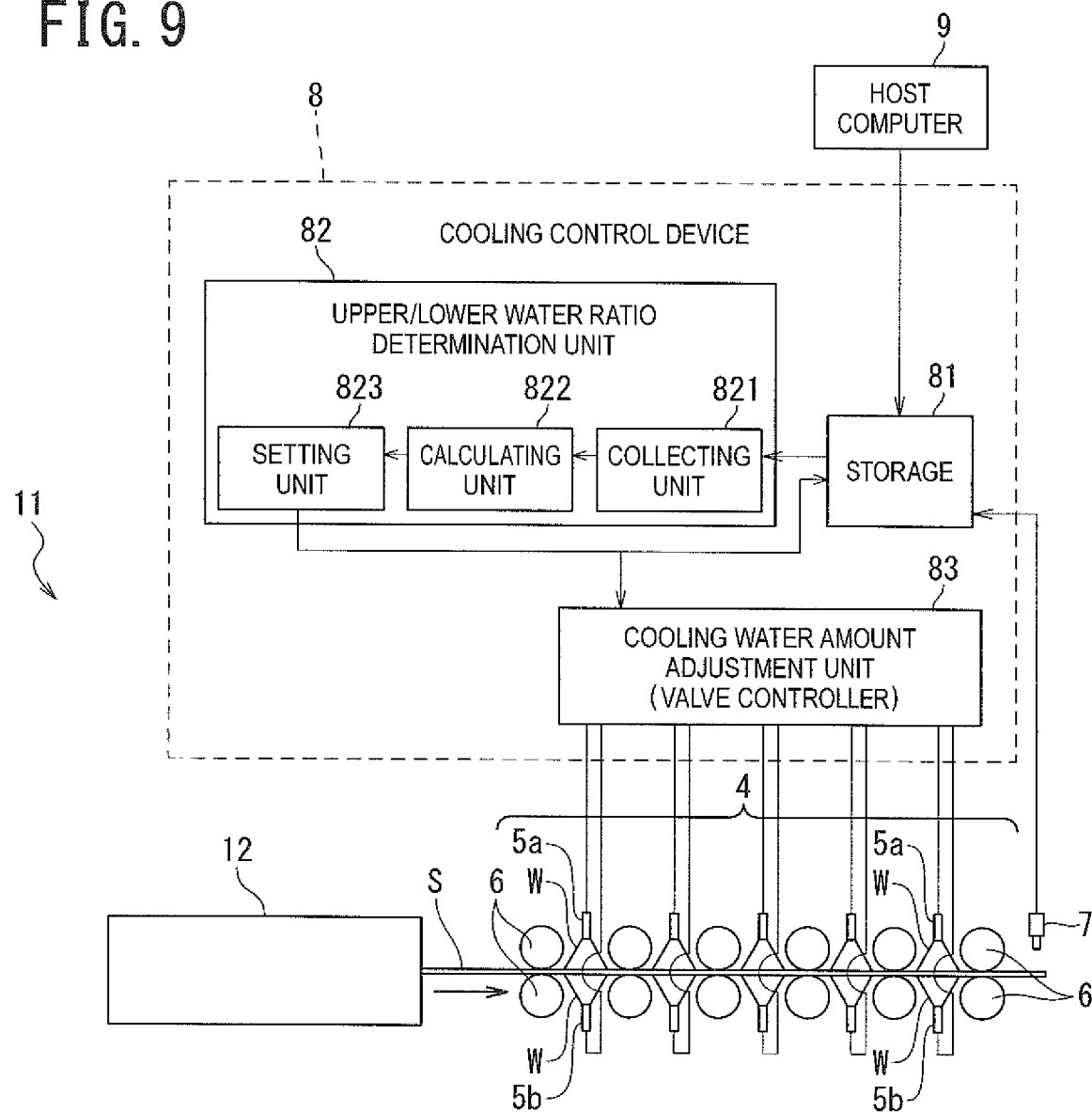
FIG. 9 is a schematic configuration view illustrating a modification example of the steel plate production equipment to which the method of cooling control for the steel plate according to the embodiment of the present invention is applied.

Moreover, the method of cooling control according to the present invention may be applied to steel plate production equipment 11 illustrated in FIG. 9, instead of the steel plate production equipment 1 illustrated in FIG. 1. In this case, the cooling control device 8 is placed at the outgoing side of a reheat furnace 12 in the conveyance direction. Herein, the reheat furnace 12 reheats the steel plate S after once air-cooling the hot-rolled steel plate S up to room temperature.

Moreover, as to the operating conditions of the steel plate S, in addition to the above items, information on rolling conditions such as a heating temperature, a finishing temperature, a rolling pass schedule, and the number of descaling passes may be also stored in the storage 81.

Moreover, as illustrated in FIG. 9, when the cooling control device 8 is placed at the outgoing side of the reheat furnace 12 in the conveyance direction, it is preferable that information such as a heating material in-furnace time, a heating temperature, and gas atmosphere in the reheat furnace 12 is stored in the storage 81.

Moreover, when the storage 81 can store therein a large amount of data, a machine learning method, a so-called method of predicting a large amount of past data as training data is useful. For example, by using methods such as learning by a neural network that has been developed in recent years, and local regression or decision tree that picks up a nearby point to be searched to perform approximation calculation, an appropriate upper/lower water ratio may be calculated by analyzing operating performance and a relationship between the upper/lower water ratio and the C-warping.

Example

In the steel plate production equipment 1 illustrated in FIG. 1, the steel plate S was cooled, which has a plate thickness of 20 mm, a plate width of 3,000 mm, a cooling start temperature of 900° C., a cooling end temperature of 50° C., C of 0.15% by mass, Si of 0.3% by mass, Mn of 1.4% by mass, and Cr of 0.28% by mass. Before that, past operating conditions of the steel plates S similar to the operating conditions of the steel plate S to be cooled, past upper/lower water ratios, past C-warping amounts δ, and past curvatures k were collected from the storage 81.

Then, relationships between the collected three past upper/lower water ratios and three past curvatures k of the steel plate S measured by the shape measuring meter 7 with respect to the steel plates S were calculated, and the graph as illustrated in FIG. 8 that indicates the relationships between the past upper/lower water ratios and the past curvatures k was created.

Next, from the calculated relationships between the past upper/lower water ratios of the steel plates S and the past curvatures k of the steel plates S, an upper/lower water ratio with respect to the steel plate S to be cooled was set in such a manner that the curvature k of the steel plate S to be cooled is zero. The upper/lower water ratio at which the curvature k of the steel plate S to be cooled is zero was 0.85.

Then, because the upper/lower water ratio with respect to the previously cooled steel plate S was 0.8, the actual indicated value of the upper/lower water ratio with respect to the steel plate S to be cooled was calculated by the above Equation (4) by using the gain G as 0.3. In other words, "(0.85−0.8)×0.3+0.8=0.815" was set as the upper/lower water ratio.

Next, an amount of cooling water to be blown onto the steel plate S was adjusted to reach the set upper/lower water ratio 0.815. Herein, when a water density (water amount (flow rate) per unit area) of the lower surface of the steel plate S is set to 3.0 m³/min·m², a water density of the upper surface of the steel plate S was set to "0.815×3.0 m³/min·m²=2.445 m³/min·m²" based on the upper/lower water ratio of 0.85.

Then, the steel plate S was cooled with the set water densities of the upper and lower surfaces of the steel plate S.

Figure 10:
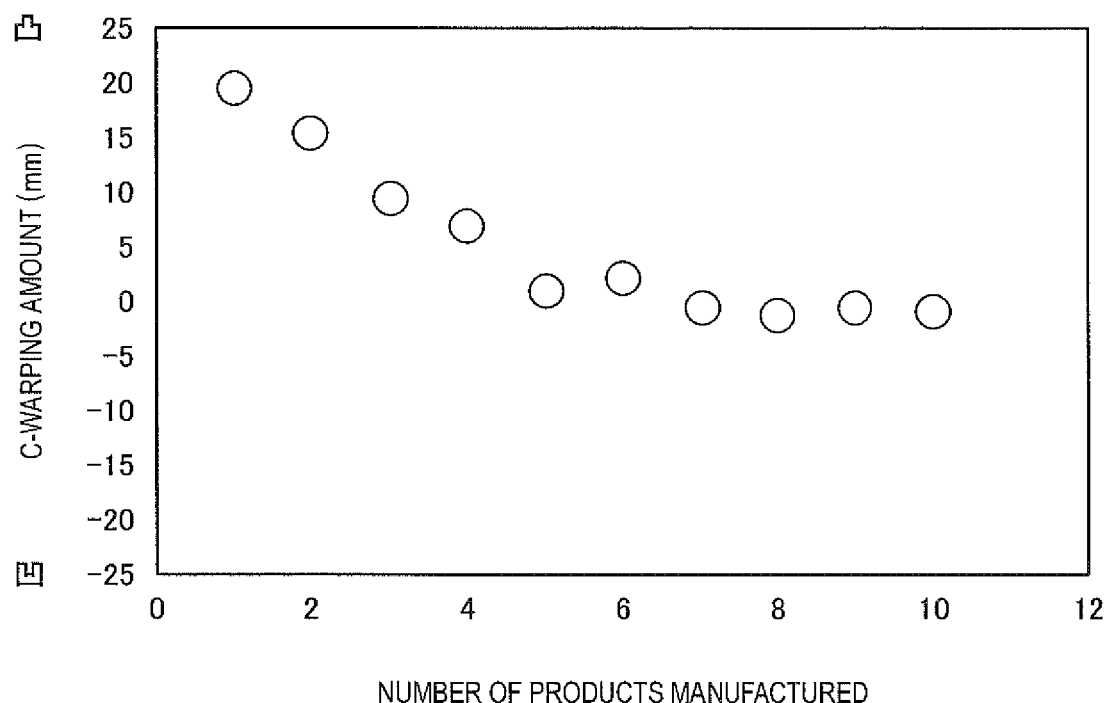
FIG. 10 is a graph illustrating a relationship between the number of products manufactured and the C-warping amount when the upper/lower water ratio is adjusted by using a method of cooling control of Example, with respect to a steel plate under an operating condition indicated by Example.

When the C-warping amount δ of the steel plate S was measured by the shape measuring meter 7 after cooling the steel plate S, the C-warping amount δ was about 20 mm on the upper convex as illustrated in FIG. 10.

Then, the C-warping amount δ (20 mm) and the curvature k measured by the shape measuring meter 7 were stored in the storage 81. Moreover, the operating conditions (plate thickness of 20 mm, plate width of 3,000 mm, cooling start temperature of 900° C., cooling end temperature of 50° C., steel composition (C of 0.15% by mass), and the like) of the cooled steel plate S, the upper/lower water ratio 0.815, the water density 3.0 m³/min·m² of the lower surface of the steel plate S, and the water density 2.445 m³/min·m² of the upper surface of the steel plate S were stored in the storage 81.

By repeating the procedure, as illustrated in FIG. 10, the shape of the steel plate S was straightened more as the number of products manufactured is increased.

REFERENCE SIGNS LIST

1 Steel plate manufacturing equipment
2 Rolling machine
3 Leveler
4 Cooling zone
5a, 5b Cooling nozzle
6 Drainer roll
7 Shape measuring meter
8 Cooling control device
9 Host computer
71 Laser ranger
81 Storage
82 Upper/lower water ratio determination unit
83 Cooling water amount adjustment unit
821 Collecting unit
822 Calculating unit
823 Setting unit
S Steel plate

The invention claimed is:

1. A method of performing cooling control for a steel plate while making the steel plate pass through a cooling zone in a conveyance direction, the method comprising:

determining an upper/lower water ratio with respect to a steel plate to be cooled in such a manner that a curvature of the steel plate to be cooled is within a target permissible range, based on only (i) a past operating condition of a steel plate, (ii) a past upper/lower water ratio with respect to the steel plate when cooling under the past operating condition of the steel plate has been implemented, and (iii) a past curvature of the steel plate converted by the following equation based on a past C-warping amount of the steel plate immediately after being cooled in the cooling zone measured by a shape measuring meter arranged at an outgoing side of the cooling zone when the cooling under the past operating condition of the steel plate has been implemented:

$k=2\times\delta/((w/2)^2+\delta^2)$, wherein k: the curvature of the steel plate, δ: the C-warping amount of the steel plate, and w: a plate width of the steel plate; and adjusting an amount of cooling water to be blown onto the steel plate to reach the upper/lower water ratio determined in the determining the upper/lower water ratio, wherein the past C-warping amount of the steel plate is measured by the shape measuring meter without measuring an upper surface temperature and a lower surface temperature of the steel plate, and the upper/lower water ratio is determined without taking into consideration the upper surface temperature and the lower surface temperature of the steel plate.

2. The method of performing cooling control for the steel plate according to claim 1, wherein the determining the upper/lower water ratio includes:

collecting the past operating condition of the steel plate similar to an operating condition of the steel plate to be cooled, the past upper/lower water ratio with respect to the steel plate when the cooling under the past operating condition of the steel plate has been implemented, and the past curvature of the steel plate converted by the equation based on the past C-warping amount of the steel plate immediately after being cooled in the cooling zone measured by the shape measuring meter arranged at the outgoing side of the cooling zone when the cooling under the past operating condition of the steel plate has been implemented;

calculating a relationship between the collected past upper/lower water ratio with respect to the steel plate and the past curvature of the steel plate; and setting the upper/lower water ratio with respect to the steel plate to be cooled in such a manner that the curvature of the steel plate to be cooled is within the target permissible range, from the calculated relationship between the past upper/lower water ratio of the steel plate and the past curvature of the steel plate.

3. A method of manufacturing a steel plate, comprising performing cooling control for the steel plate using the method according to claim 1.

4. A method of manufacturing a steel plate, comprising performing cooling control for the steel plate using the method according to claim 2.

5. A system comprising:

a cooling control device for a steel plate performing cooling control while making the steel plate pass through a cooling zone in a conveyance direction; and a shape measuring meter arranged at an outgoing side of the cooling zone, wherein the cooling control device includes:

an upper/lower water ratio determination unit configured to determine an upper/lower water ratio with respect to a steel plate to be cooled in such a manner that a curvature of the steel plate to be cooled is within a target permissible range, based on only (i) a past operating condition of a steel plate, (ii) a past upper/lower water ratio with respect to the steel plate when cooling under the past operating condition of the steel plate has been implemented, and (iii) a past curvature of the steel plate converted by the following equation based on a past C-warping amount of the steel plate immediately after being cooled in the cooling zone measured by the shape measuring meter a when the cooling under the past operating condition of the steel plate has been implemented:

$k=2\times\delta/((w/2)^2+\delta^2)$, wherein k: the curvature of the steel plate, δ: the C-warping amount of the steel plate, and w: a plate width of the steel plate, and a cooling water amount adjustment unit configured to adjust an amount of cooling water to be blown onto the steel plate to reach the upper/lower water ratio determined by the upper/lower water ratio determination unit, wherein the shape measuring meter is configured to measure the past C-warping amount of the steel plate without measuring an upper surface temperature and a lower surface temperature of the steel plate, and the upper/lower water ratio determination unit is configured to determine the upper/lower water ratio without taking into consideration the upper surface temperature and the lower surface temperature of the steel plate.

6. The system according to claim 5, wherein
the upper/lower water ratio determination unit includes:
a collecting unit configured to collect the past operating condition of the steel plate similar to production specifications of the steel plate to be cooled, the past upper/lower water ratio with respect to the steel plate when the cooling under the past operating condition of the steel plate has been implemented, and the past curvature of the steel plate converted by the equation based on the past C-warping amount of the steel plate immediately after being cooled in the cooling zone measured by the shape measuring meter arranged at the outgoing side of the cooling zone when the cooling under the past operating condition of the steel plate has been implemented;

a calculating unit configured to calculate a relationship between the collected past upper/lower water ratio with respect to the steel plate and the past curvature of the steel plate; and a setting unit configured to set the upper/lower water ratio with respect to the steel plate to be cooled in such a manner that the curvature of the steel plate to be cooled is within the target permissible range, from the calculated relationship between the past upper/lower water ratio of the steel plate and the past curvature of the steel plate.

* * * * *